Inventor
J. Pountnay
By Clarence A. O'Brien
Attorney

Patented June 30, 1936

2,046,087

UNITED STATES PATENT OFFICE 2,046,087

EXPANDER DEVICE

John Pountnay, Daytona Beach, Fla.

Application June 18, 1935, Serial No. 27,253

3 Claims. (Cl. 192—6)

This invention relates to coaster and brake devices and more particularly to an improved expander for use in connection with such devices.

My invention consists broadly in the provision of what I term a graduator expander the same being adapted to fit into the usual slot of the sleeve forming one of several parts of a coaster and brake device of the type used generally on bicycles; and to cooperate with the usual expander wedge for insuring a positive and efficient expansion of the sleeve and thereby insure a more efficient operation of the coaster and brake devices.

The invention together with its objects and advantages will be best understood from a study of the following description taken in connection with the accompanying drawing wherein.

Figure 1:
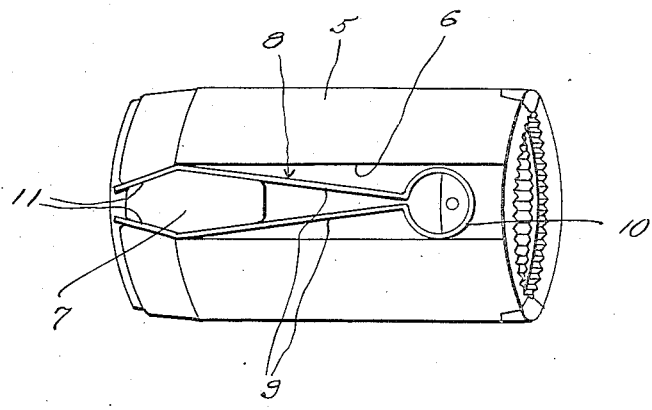
Figure 1 is a perspective view illustrating the application of the invention.
Figure 2:
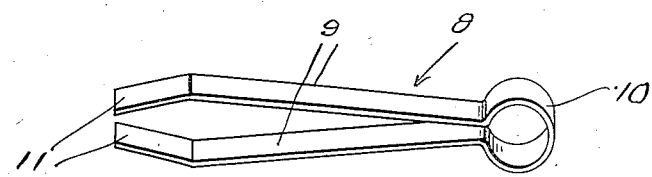
Figure 2 is a perspective view of the expander.

As is well known, coaster and brake devices of the type generally used on bicycles and similar vehicles include among other parts an expansible member consisting of a sleeve, illustrated in the drawing and indicated by the reference numeral 5. The sleeve 5 is expansible, is preferably of cylindrical form, and is slotted from one end to near the other end thereof. In the present invention, the slot of the sleeve is indicated by the reference numeral 6 and as is conventional, the slot 6 is open and tapered at one end so as to fit upon the usual wedge 7.

For use with such sleeve 5 and wedge 7 I provide an expander device indicated generally by the reference numeral 8 which will serve to expand the sleeve quicker than is the case with the wedge 7 alone to the end that a better and more efficient braking action will be obtained.

My expander 8 is formed from a single length of resilient strap metal dimensioned, shaped and worked to provide a pair of flat elongated arms 9 converging at one end and at their converging ends formed integral with a split circular head 10. At their respective opposite or free ends the arms 9 are offset inwardly toward one another as at 11.

In actual practice, the expander 8 fits within the slot 6 of the sleeve 5 with the arms 9 at their respective ends 11 straddling the wedge 7 as clearly shown in Figure 1.

My improved expander works as follows. When the rider desires to apply the brake, the pedal rotation of the bicycle is reversed resulting in a movement (through mechanism not shown but well known in coaster brake devices of this character) of the wedge 7 whereby the latter is forced into the tapered end of the slot 6 thereby expanding the sleeve 5. Due to the inherent tendency of the arms 9 of the expander to separate, the improved expander will supplement the action of the wedge 7 with the result that the sleeve will be expanded more quickly to the end that said sleeve will be held stationary in a positive and efficient manner for applying the braking action in the well known manner.

Having thus described the invention, what is claimed as new is:

1. In a brake mechanism, the combination of an expansible friction brake sleeve having a longitudinal slot open and tapered at one end, a wedge member engaged in the tapered end of the slot, and a resilient elongated expander member arranged within the slot and having portions straddling said wedge.

2. In a brake mechanism, the combination of an expansible friction brake sleeve having a longitudinal slot open and tapered at one end, a wedge member engaged in the tapered end of the slot, a resilient elongated expander member arranged within the slot and having portions straddling said wedge, said resilient expander member comprising a pair of arms converging at one end and at said end being formed integral with a split circular head fitting within the slot, said arms at their free ends having terminals offset inwardly.

3. An expander of the character described formed from a single length of resilient metal and comprising an integral annular split head having straight, flat arms extending therefrom in diverging relation, said arms having free ends offset inwardly toward one another.

JOHN POUNTNAY.